Nov. 13, 1956  C. DE B. WHITE ET AL  2,770,762
CRYSTAL TRIODES
Filed March 28, 1950
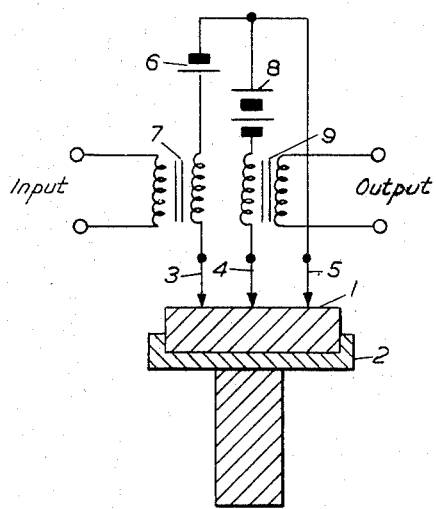
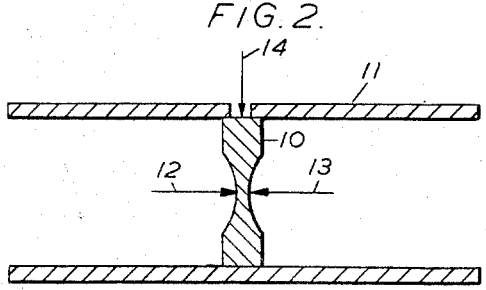
Inventors
CHARLES DeB. WHITE
KENNETH A. MATTHEWS
By
Attorney

United States Patent Office 2,770,762
Patented Nov. 13, 1956

2,770,762

CRYSTAL TRIODES

Charles de Boismaison White and Kenneth Albert Matthews, London, England, assignors to International Standard Electric Corporation, New York, N. Y.

Application March 28, 1950, Serial No. 152,301

Claims priority, application Great Britain April 1, 1949

11 Claims. (Cl. 317—235)

The present invention relates to electric amplifying devices employing semi-conducting materials, which have been called for convenience "crystal triodes."

It is already known that certain crystalline semi-conducting materials are suitable for use as point-contact rectifiers (generally known as crystal detectors), and that such a material may be made to act as an amplifier by mounting a body of the material on or in a suitable metal base or holder which makes electrical contact with the body over an extended area, and by providing it with two fine wire electrodes or cat whiskers arranged very close together in contact with the surface of the body. By suitably polarising the electrodes with respect to the base the device can be made to operate as an amplifier similarly to a thermionic valve, and for this reason the device has been called a "crystal triode" by analogy. However the word "triode" is not intended to be restricted to a device having just three electrodes; as in the case of thermionic valves there may be additional electrodes employed for control purposes.

In such crystal triodes known hitherto, two cat whisker electrodes are provided, and one of them called the emitter electrode, is polarised with respect to the base electrode in the good conducting or low resistance direction, while the other, called the collector electrode, is polarised with respect to the base in the poor conducting or high resistance direction. The best semi-conducting material at present known for this purpose is germanium, and a suitable material for the cat whiskers is Phosphor bronze.

We have found that the base electrode may be replaced by a cat whisker provided that this makes contact with the semi-conductor at a distance from either the emitter or collector electrode that exceeds the distance at which it can act as either an emitter or collector electrode with respect to either of them.

According to one feature of the present invention, therefore, there is provided an electric amplifying device comprising a semi-conducting body suitable for use in a point contact rectifier, two contacts placed close together, and suitable for operating with a common base electrode as input and output contacts respectively, and a cat whisker placed in contact with the said body at a distance from either of the said contacts exceeding that at which it can act as either emitter or collector electrode with respect to either of the said contacts.

The base electrode of extended area is not necessarily dispensed with as such a base electrode may provide a convenient means for mounting the semi-conducting body in a holder. Furthermore for certain purposes the presence of an extended electrode in contact with the crystalline body is of advantage irrespective of whether or no it is connected in the circuit in which the amplifier is used.

According to another feature of the invention, there is provided an electric amplifying device comprising a body of crystalline semi-conducting material of the kind which is capable of giving amplification between an input circuit connected to input electrodes and an output circuit connected to output electrodes, two cat whisker electrodes making contact with the said body at such a distance apart that they are able to act respectively as emitter and collector electrodes, and a third cat whisker electrode placed so far from either of the other electrodes as not to act as an emitter electrode, the said three electrodes being respectively connected to separate terminals.

It has been found that the device according to the invention may provide a better amplification than the hitherto known crystal triodes. This may in certain cases be due to the properties of a cat whisker contact, according to which it introduces a certain amount of positive feedback between the output and input circuits, when used as an electrode common to these circuits.

It should be pointed out that a crystal triode having more than two cat whisker electrodes has been proposed, provided, in addition to the usual collector and emitter electrodes, with a third cat whisker placed near the collector electrode, and acting as an additional emitter electrode. The arrangement of the present invention is distinguished from this arrangement in the following essential respect, namely, that the third cat whisker is placed at such a distance from either of the other electrodes that it cannot act as an emitter electrode to either.

The accompanying drawing shows in Fig. 1 an example of an amplifying device according to the invention with the associated circuit, and in Fig. 2 a modified form of the device.

The device shown in section in Fig. 1 comprises a crystal or body of germanium 1 soldered or otherwise electrically connected to a metal base or holder 2. Three fine wire electrodes (cat whiskers) 3, 4, 5, shown as arrow points, are arranged in contact with the surface of the germanium. Of these the electrodes 3 and 4 are respectively the usual emitter and collector electrodes, while the electrode 5 is an additional electrode provided according to the invention. There may also be other similar additional electrodes (not shown).

According to the usual practice, the electrodes 3 and 4 will be placed one or two thousandths of an inch apart. Assuming that the electrode 5 will be used as an operating electrode instead of the base or holder 2 is should be placed sufficiently far away from either of the other electrodes to prevent it from being able to act as either a collector electrode or an emitter electrode in co-operation with either of the other electrodes. A suitable spacing for the third electrode might be fifteen thousandths of an inch.

In the case of semi-conducting materials for use in rectifiers, it has been the practice in some circles to divide the materials into two classes, namely N-type materials and P-type materials. In the N-type, the conduction of the current in the material is supposed due to the migration of a few free electrons, while in the P-type it is said to be due to the migration of what are called "positive holes," that is, deficiencies of electrons in a few atoms of the material. Either type of material can be used for the production of crystal triodes.

It will be assumed for example that the germanium body 1 is of the N-type. In that case the emiter electrode 3 will be polarised positively with respect to the additional electrode 5 (that is, in the good conducting direction) by means of a suitable source 6. The secondary winding of an input transformer 7 is connected in series between the source 6 and the emitter electrode 3. The potential of the source 6 should be small, preferably not greater than 1 volt.

The collector electrode 4 is polarised negatively with respect to the additional electrode 5 (that is, in the poor conducting direction) by means of a suitable source 8, whose potential might be anything between about 5 and 50 volts. The primary winding of an output transformer 9 is connected in series between the source 8 and the electrode 4. Signals to be amplified may be supplied to the primary winding of the input transformer 7, and corresponding amplified signals will then be obtained from the secondary winding of the output transformer 9. It will be seen that the additional electrode 5 serves as a common base electrode for the input and output electrodes 3 and 4, and is also a common terminal for the input and output circuits of the device.

This circuit is given as a simple example of an amplifying circuit employing a device according to the invention. Various other arrangements are possible, the only essential being the proper biassing of the electrodes 3 and 4 with respect to the electrode 5.

If the germanium body 1 is of the P-type, the only necessary modification of the circuit shown is to reverse the connections of each of the sources 6 and 8.

A modified form of the device is shown in section in Fig. 2. The germanium crystal 10 takes the form of a thin disc of germanium perhaps 0.05 inch in diameter, and reduced at the centre to a thickness of between 0.001 and 0.002 inch. The disc 10 may be mounted in a metal tube 11 in some convenient way. The emitter and collector electrodes 12 and 13 are arranged in contact with the disc 10 on opposite sides of the central reduced portion. The additional electrode 14 provided according to the invention makes contact with the edge of the disc 10 through a small hole 15 in the tube 11. No attempt has been made to indicate the manner in which the electrodes are supported, as the figure is intended to be purely diagrammatic. The same is true of Fig. 1, and the electrodes may be mounted or supported in any convenient way.

The device illustrated in Fig. 2 can be used with the circuit shown in Fig. 1 if the electrodes 12, 13 and 14 are connected in the place of the electrodes 3, 4 and 5 respectively. It may be added that the functions of the electrodes 12 and 14 could be interchanged.

The electrodes 3, 4, 5 of Fig. 1, or 12, 13, 14 of Fig. 2, preferably consist of fine sharply pointed Phosphor bronze wires or cat whiskers, and a suitable electroforming treatment should be applied to the electrodes, preferably the process described in the specification of a co-pending application to K. A. Matthews-C. de B. White, U. S. Serial No. 150,412, filed March 18, 1950, now Patent No. 2,653,374.

It should be understood that although the amplifying devices described with reference to Figs. 1 and 2 employ germanium as the active material, other suitable semiconductors could be used.

While the principles of the invention have been described above in connection with specific embodiments, and particular modifications thereof, it is to be clearly understood that this description is made only by way of example, and not as a limitation on the scope of the invention.

What is claimed is:

1. An electric amplifying device comprising a semiconducting body adapted to be used in a point-contact rectifier, a plurality of point-contact electrodes making contact with said body, a pair of said electrodes being emitter and collector electrodes with respect to each other and each making contact with said body close to the other, and a third one of said electrodes in contact with said body at a distance from said pair of electrodes exceeding that at which it can act as either emitter or collector electrode with respect to either of said pair of electrodes.

2. An electric amplifying device according to claim 1 further including a common base electrode making contact over an extended area with said body.

3. An electric amplifying device according to claim 1 in which the pair of electrodes and the third electrode all make contact with a substantially flat exposed surface of the semi-conducting body.

4. An electric amplifying device according to claim 1 in which said body is a disk of semi-conducting material, one of the pair of electrodes being connected to one side of said disk and the other of said pair of electrodes being connected to the opposite side of said disk and the third electrode being connected on the edge of the disk.

5. A crystal triode according to claim 1 in which germanium is used as the semi-conducting material, and in which the electrodes comprise sharply pointed Phosphor bronze wires, the points of two of the wires being spaced between 0.001 and 0.002 inch apart, the point of the third wire being about 0.015 inch from the point of one of the other wires.

6. An electric amplifying device according to claim 4 in which germanium is used as the semi-conducting material and in which the thickness of the central portion of the disc is reduced to between one and two thousandths of an inch.

7. A semi-conductor amplifier or oscillator device comprising a semi-conducting body, and three electrodes only in contact with said body, one of said electrodes being the base electrode, the contact areas of said electrodes with said body having substantially equal size.

8. A semi-conductor device suitable as an amplifier or oscillator and consisting of a semi-conducting body, an emitter electrode, a collector electrode and a base electrode in contact with said body, the contact areas of said electrodes with said body being substantially equal and small compared to the surface area of said body.

9. A semi-conductor device suitable as an amplifier or oscillator and consisting of a semi-conducting body having a substantially flat surface, an emitter electrode, a collector electrode and a base electrode in contact with said surface, the contact areas of said electrodes with said surface being substantially equal and small compared to the area of said surface.

10. A semi-conductor device suitable as an amplifier or oscillator and comprising a semi-conducting body, and three point electrodes including a base electrode in contact with said body, one of said electrodes being remote from the other two electrodes, said other two electrodes being located relatively close to each other, the contact areas of said electrodes with said body being of substantially equal size.

11. A semi-conductor amplifier or oscillator device comprising a semi-conducting body, and three point electrodes in contact with said body, one of said electrodes being remote from the other two electrodes, said remote electrode being the base electrode, the contact areas of said electrodes with said body having substantially equal size.

References Cited in the file of this patent

UNITED STATES PATENTS

| Number | Name | Date |
|---|---|---|
| 2,476,323 | Rack | July 19, 1949 |
| 2,502,479 | Pearson | Apr. 4, 1950 |
| 2,524,034 | Brattain et al. | Oct. 3, 1950 |
| 2,524,035 | Bardeen et al. | Oct. 3, 1950 |
| 2,553,490 | Wallace | May 15, 1951 |
| 2,560,579 | Kock et al. | July 17, 1951 |
| 2,586,080 | Pfann | Feb. 19, 1952 |
| 2,597,028 | Pfann | May 20, 1952 |
| 2,600,500 | Haynes et al. | June 17, 1952 |
| 2,609,428 | Law | Sept. 2, 1952 |